Oct. 5, 1954  J. KELLOGG  2,691,080
MASTER CONTROLLER AND DYNAMIC BRAKE CONTROL FOR HOISTS
Filed June 24, 1949  3 Sheets-Sheet 1

Inventor
Joseph Kellogg
by Parker & Carter
Attorneys

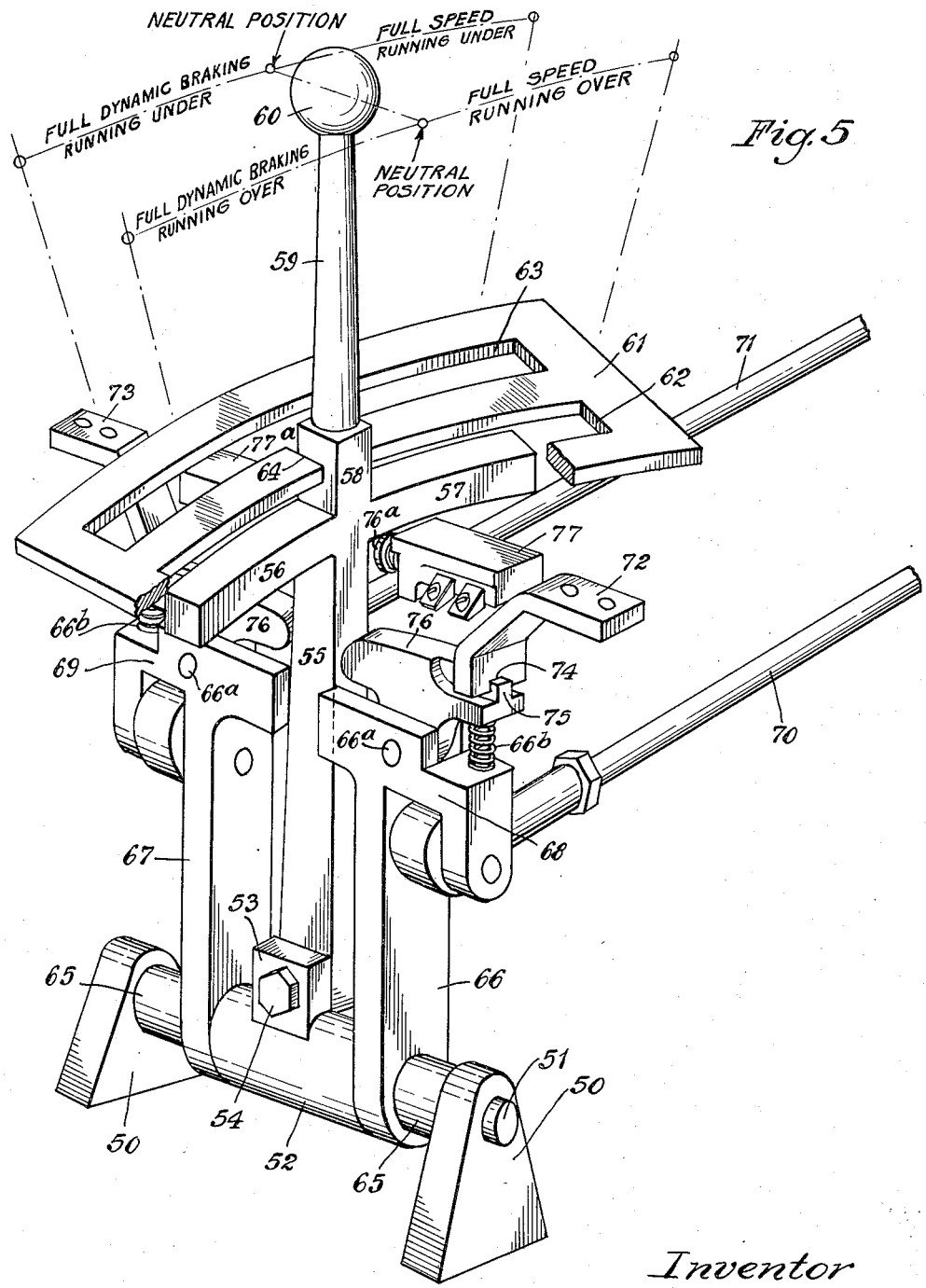

Oct. 5, 1954   J. KELLOGG   2,691,080
MASTER CONTROLLER AND DYNAMIC BRAKE CONTROL FOR HOISTS
Filed June 24, 1949   3 Sheets-Sheet 3
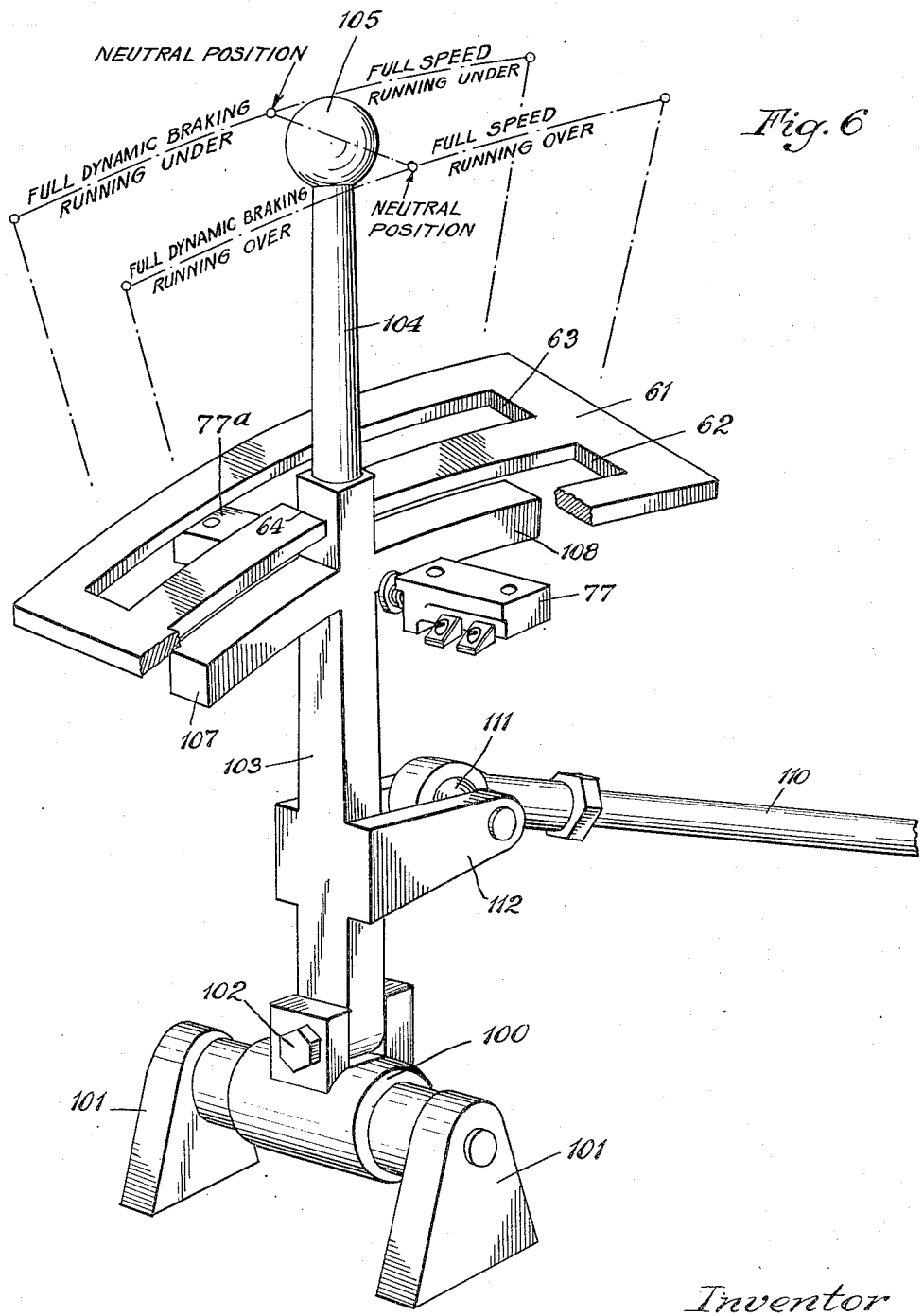

Patented Oct. 5, 1954

2,691,080

UNITED STATES PATENT OFFICE 2,691,080

MASTER CONTROLLER AND DYNAMIC BRAKE CONTROL FOR HOISTS

Joseph Kellogg, Milwaukee, Wis., assignor to Nordberg Manufacturing Company, Milwaukee, Wis., a corporation of Wisconsin Application June 24, 1949, Serial No. 101,064

9 Claims. (Cl. 200—18)

My invention relates to improvements in hoist controls, one purpose of which is to provide an improved master controller and brake control for hoist drums.

Another purpose is to provide such a control in which a single lever is employed.

Another purpose is to provide a brake control for hoists, which combines a master controller and a dynamic brake control employing a single lever with a full interlock.

Other purposes will appear from time to time in the course of the specification and claims.

I illustrate the invention more or less diagrammatically in the accompanying drawings, wherein:

Figure 5 is a perspective illustration, with parts omitted, of another embodiment of my invention; and Figure 6 is a partial perspective illustration of another embodiment of my invention.

Like parts are indicated by like symbols throughout the specification and drawings.

Figure 2:
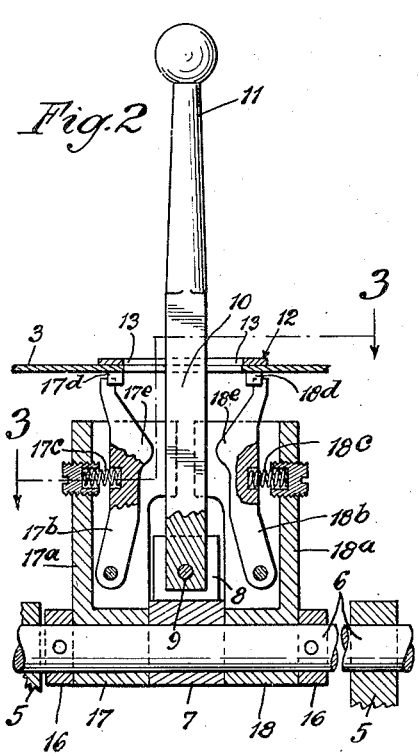
Figure 2 is a section on the line 2—2 of Figure 1.

Referring to the drawings and first to Figures 1 to 4, 1 generally indicates a control console, positioned on any suitable supporting surface 2. It has an upper wall 3 and a lower wall 4. Mounted on the lower wall 4 are bearing elements 5, in which is journaled a control shaft 6. Mounted on the shaft 6 is a central hub 7, having elongations 8 at one end. Pivoted to the elongations 8, as at 9, is the manual control handle 10, the upper portion 11 extending above the console wall or top 3. Mounted on or forming part of the console top 3 is the slotted element 12, which has parallel slots 13, separated by solid portions 14. The solid portions 14 are broken, as at 15, to produce an H shaped slot system in the plate 12.

Figure 3:
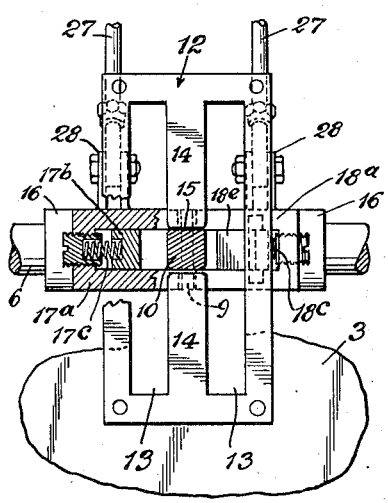
Figure 3 is a section on the line 3—3 of Figure 2.

It will be understood that the handles 10, 11, when swung to the right or left, referring to the position of the parts as shown in Figure 3, can be moved through the separation 15 into either one of the slots 13. It may then be moved longitudinally along whichever of the two slots it has entered, but selectively positionable at either end of such slot. Thus, besides the neutral intermediate position in which the lever 11 is shown in Figure 3, it may be positioned at four control positions, one at each end of each of the slots 13.

Positioned between the central hub 7 and the keyed or pinned spacers 16 are hubs 17, 18, which are normally rotatable on the shaft 6. Each such hub carries an upward arm or extension 17a or 18a, to which is pivoted a locking lever 17b or 18b. These levers are normally urged toward the locking position in which they are shown in Figure 2 by adjustable springs 17c or 18c. The upper ends of the locking levers are adapted to engage normally fixed locking abutments 17d or 18d. It will be observed that each of the levers 17b and 18b is laterally interlatched as at 17e or 18e to provide a ready abutment to maintain a contact of limited area, when the hand lever 10, 11 is swung from its neutral position of Figures 2 or 3 into contact with either of the locking levers. It will be understood that when the handle 11 is in neutral position in the slot portion 15, both of the arms 17a and 18a are locked in position. Thus any controls which are secured to them are also locked in position. The handle 10, 11 cannot be moved to neutral position without leaving the previously contacted locking lever in a proper position to be spring thrust into locking contact with the locking abutment 17d or 18d.

Figure 4:
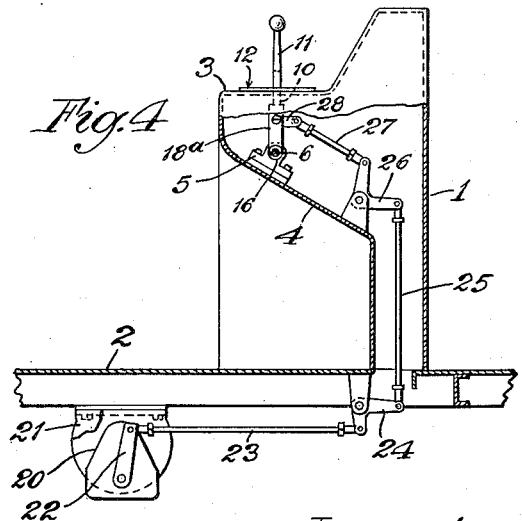
Figure 4 is a vertical section on a smaller scale, illustrating the application of the control assembly to the switch structure.

Each of the arms 17a or 18a has secured to it a control element. With reference, for example, to Figure 4, I illustrate a plurality of drum-type master switches 20, 21, each suitable to control a hoist motor. Since the hoist, the hoist motor, and the switches do not of themselves form part of the present invention, they are not herewith illustrated in detail.

Taking the master switch 20 as typical, it is provided with an actuating lever 22, to which is pivoted the radius rod or push-pull member 23. The rod 23 is pivoted to one arm of the bellcrank lever 24. To the opposite end of the lever 24 is pivoted the push-pull member 25. It, in turn, is pivoted to the upper bell-crank lever 26, mounted rotatably within the console 1. The opposite arm of the lever 26 has pivoted to it a push-pull member 27. The member 27 is pivoted at its opposite end to an ear 28 extending from the arm 18a. It will be understood that one or more of the members 23, 25 or 27 may be made adjustable as to length. Any suitable means may be employed to tighten, loosen or suitably adjust the various members in the line of drive between the switch control lever 22 and the lever 18a. It will be understood that an identical line of drive is used between the lever 17a and the drum-type master switch 21.

For operation of the device when the lever 10, 11 is left in the neutral position in which it is shown in Figures 2 and 3, the arms 17a and 18a are locked by the levers 17b and 18b in neutral position. The control arms 22 of the master switch are thereby held in neutral position. As the operator moves the lever 10, 11 to the right, referring to the position of the parts as shown in Figures 2 and 3, the lower part of the lever contacts the bearing projection 18e of the lever 18b and moves it against the spring 18c out of engagement with the fixed locking abutment 18d. When the operator has moved the control lever into alignment with the right-hand slot 13, he can therefore move it toward either end of the slot. The result is a rotation of the switch control lever 22 either to the right or to the left. Similarly, the lever 10, 11 may be employed to control a position of the corresponding lever of the master switch 21 by moving it into the left-hand slot 13 of Figure 3.

Figure 5 illustrates somewhat diagrammatically a somewhat modified structure in which switch actuation is also obtained directly by the lateral movement of a control lever from a neutral position in the intermediate arm of an H-shaped slot. Referring to Figure 5, it will be understood that the console parts are omitted for convenience, but that in practice, a console such as is shown in Figure 4 is used. Figure 5 should be read as including such a console.

Console supported brackets 50 carry the shaft 51. The central hub 52 has an outward extension 53 to which is pivoted, as at 54, the lower lever portion 55. This lever portion has a pair of cross arms 56, 57 and a short upward extension 58 thereabove, in the form of a rectangular block. 59 is an upper lever portion terminating in the manual engageable ball 60. 61 indicates a slotted plate, having a right-hand slot 62, a left-hand slot 63 and a central cross slot 64 connecting them.

Normally rotatable on the shaft 59, between the hub 52 and the spacers 65, is a right-hand arm 66 and a left-hand arm 67. Each such arm has a top cross piece 68, 69 to which is pivoted an actuating rod or push-pull member 70 or 71, which forms part of a system such as is shown in Figures 1 to 4. Specifically, I wish Figure 5 to be understood as including a suitable actuating connection to a suitable master switch, such as is shown, for example, at 20 or 21 in Figure 4.

Figure 1:
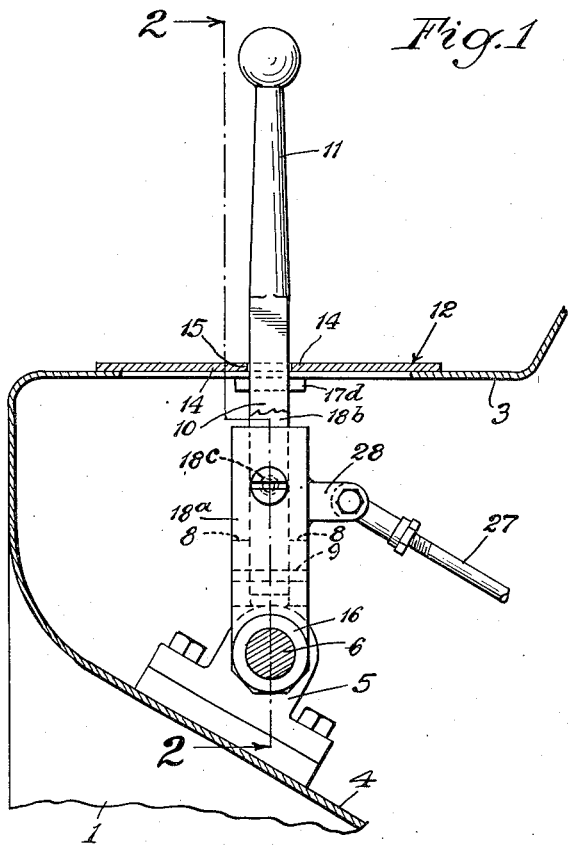
Figure 1 is a vertical section through an embodiment of my invention.

72, 73 indicate locking lugs which may be welded or otherwise secured to the lower side of the console deck, such as the deck or wall 3 of Figures 1 and 4. The locking lugs may be slotted, as at 74, to receive an entering portion 75 on locking levers 76, of which one is pivoted between ears to each of the arms 66, 67, as at 66a. Springs 66b are positioned normally to hold the latches 66 in the latching position in which they are shown in Figure 5, when the lever block 58 is in neutral position.

As in the case of the form of Figures 1 to 4, the movement of the lever assembly from neutral position engages one or the other of the latching levers and thus releases either the arm 66 or the arm 67 for movement in unison with the lever 55, when the lever is moved along either the slot 62 or the slot 63. Thus the structure of Figure 5, although slightly changed in detail, performs the functions above described in connection with the structure of Figures 1 to 4.

An additional feature is the provision for dynamic brake control. Since the lever structure, which includes the manual engageable portion 59 or 60, is in effect universally connected at its lower end, it can readily be swung from neutral position and moved from end to end of each of the slots. The arms 56 and 57 on the lever 55 are adapted to control the switch structures 77 and 77a, while the lever is moving backward or forward through either of the H slots in the plate 61.

It will be understood that the switches 77 and 77a will be secured to the lower surface of the console deck. Each switch 77 or 77a may serve the double purpose of selecting the direction of rotation of the hoist when depressed and of acting as an "off-position" switch when released. Since a wide variety of circuits may be employed and since the circuits do not of themselves form part of the present invention, they are not herein shown in detail. It will be understood, however, that two individual switch elements, controlled by the members 76a, should be wired in series to compel the lever block 58 to be in dead center or locked position as shown in Figure 5, before an under voltage contactor can be closed to give current to the secondary circuit. The springs 66b furnish the locking force and also serve to maintain the operating lever 55 in the central neutral position when the operator's hand is removed from the handle 59 or ball 60. A light spring force may also be provided to force the operating lever back to neutral, whenever dynamic braking is being applied. Such a spring would also enable the operator to feel the amount of dynamic braking being applied.

Referring to the form of Figure 6, I illustrate a simplified structure in which a hub 100 is rotatable about a horizontal axis in any suitable supports 101. Pivoted to it, as at 102, is the lever structure generally indicated as 103. This lever structure terminates in an upper manual control portion 104, with any suitable hand knob 105 at the top. The lever has the same relation to the plate 61 as does the lever in the form of Figure 5. The lever includes cross-pieces or lateral extensions 107, 108, like the extensions 56, 57 of the lever of Figure 5. These are opposed to switches 77, 77a, as in the case of Figure 5. However, in place of the provision of the somewhat complicated structure of Figure 5, I find it advantageous to employ a single rod 110, extending to any suitable single master switch, not herein shown. This rod 110 is secured by any suitable universal connection to the lever 103. I illustrate, for example, a ball connection 111, suitably secured to any suitable lateral extension 112 of the lever 103. The details of the connection are not important. It will be understood, however, that I employ a connection which permits rotation of the lever 103 about the axis of the hub 100 and also permits rotation of the lever 103 about the axis 102, all while maintaining an adequate actuating connection between the lever 103 and the control rod 110.

For convenience, the results of individual movements or positions of the lever 103 are indicated in Figure 6, as in Figure 5. With the simplified structure of Figure 6, I am able to use a single master switch in place of the multiple master switches employed with the other forms herein shown. Whereas I do not illustrate any master switch in Figure 6, it will be understood that a single master switch, like one of the master switches 20, 21 of Figure 4, may be employed. In operation, the entire control is obtained by a single master switch, by the actuation of a single lever.

It will be realized that whereas I have described and shown a practical and operative device, nevertheless many changes may be made in size, shape, number and disposition of parts without departing from the spirit and content of my invention. I therefore wish my description and drawings to be taken as in a broad sense illustrative or diagrammatic, rather than as limiting me to my specific showing herein.

The use and operation of my invention are as follows:

While my invention may have other applications, I illustrate it as applicable to a two-drum hoist assembly. Each drum is controlled by one of the master switches 20, 21 of Figure 4. Each such master switch is controlled by one of the levers 17a, 18a or 66, 67.

In the form of Figure 5, in addition to the control of the master switches for the two-drum hoist motors, I illustrate the additional use of the single lever to actuate additional switches used, for example, for braking.

It should be kept in mind that in hoisting equipment, such as mine hoists in which a hoist drum or plurality of drums may be used to draw in or pay out cable, the braking function becomes vitally important. The present structure permits an operator, using a single control element, to control both the motoring and the braking forces of the drum or drums used. The structure herein described may be applied to a two-drum structure, the single lever controlling the motoring and the braking for both drums. More broadly stated, my invention may be applied to situations where inertia is set up by the operation of control equipment, my control assembly being effective, with a single control element, to control deceleration as well as acceleration.

The present invention is applicable to an operating A. C. motor used for example to actuate a hoist drum. The dynamic braking is obtained by opening the A. C. circuit and by supplying D. C. current to the field of the motor.

Considering specifically Figure 5, the switches 77 and 77a may be introduced to serve as the off-position and directional switches, so that the contact points of the master switch may be used for motoring or dynamic braking control. Thus when the lever 59 is moved along either slot, it controls the motoring when moved in one direction and controls the dynamic braking when moved in the other.

I claim:

1. In a control system for hoists and the like, a guide member having an H-shaped slot system, a control lever mounted for ready movement through the cross slot and along the side slots of the H, two actuating levers each rotatable with the control lever when the control lever is moved along one of the side slots, a locking element for each actuating lever formed and adapted to lock the lever against unintended movement when the control lever is in neutral position in the cross slot, each locking element being adapted for release by contact of the control lever when the control lever is moved against it.

2. The structure of claim 1, characterized by and including a movable latch, engageable by the control lever, mounted on each actuating lever and fixed locking abutment therefor, fixed in relation to said guide member.

3. The structure of claim 1, characterized by and including a shaft having a generally horizontal axis located beneath said guide member and generally parallel with the cross slot of the H, and a hub intermediate the ends of said shaft, the control lever being pivoted to said hub for rotation about an axis perpendicular to the axis of the shaft and generally parallel with the side slots of the H.

4. The structure of claim 1, characterized by and including a shaft having a generally horizontal axis located beneath said guide member and generally parallel with the cross slot of the H, and a hub intermediate the ends of said shaft, the control lever being pivoted to said hub for rotation about an axis perpendicular to the axis of the shaft and generally parallel with the side slots of the H, the actuating levers being rotatable in relation to said shaft and being located one on each side of said hub.

5. The structure of claim 1, characterized by and including switch actuating elements located adjacent said guide member, at least one of said elements being engageable by the control lever, when the control lever is positioned in either side slot, said control lever having portions formed and adapted to maintain contact with said switch actuating member throughout the excursion of the control lever in the slot adjacent such switch actuating member.

6. The structure of claim 1, characterized by and including switch control elements positioned and adapted for actuation by the control lever, when the control lever is moved out of neutral position in the cross slot.

7. In a control system for motors, a control lever mounted for movement along a predetermined path, a switch, a connection between said control lever and said switch actuatable by said lever in response to said movement along said path, and an additional switch control member normally engageable by said lever during its movement along said path, said lever being mounted for additional movement transversely to said path, whereby it may be moved out of engagement with said last-mentioned switch member.

8. In a control system for motors for hoists and the like, in which alternating current is employed, a single control lever mounted for movement along a predetermined path, a single master switch adapted for motoring and for dynamic braking control of the motor, an actuating connection between said switch and said control lever, actuatable by said lever in response to its movement along said path, and an additional off-position and directional switch assembly engageable by said lever in response to movement of said lever transversely of said predetermined path.

9. In a control system for hoists and the like, a guide member having an H-shaped slot system consisting of two parallel, longitudinal slots and a cross-slot connecting them, a control lever mounted for ready movement through the cross-slot and along the side slots of the H, two actuating levers, each rotatable coaxially with the control lever when the control lever is moved along one of the side slots, a locking element for each actuating lever formed and adapted to lock said actuating lever against unintended movement when the control lever is in neutral position in the cross-slot, each locking element having release means actuable by contact of the control lever when the control lever is moved against it.

References Cited in the file of this patent

UNITED STATES PATENTS

| Number | Name | Date |
|---|---|---|
| 1,629,666 | Keeler | May 24, 1927 |
| 2,419,908 | Mott | Apr. 29, 1947 |

FOREIGN PATENTS

| Number | Country | Date |
|---|---|---|
| 405,644 | Great Britain | Jan. 29, 1934 |